(12) United States Patent
Ohkubo et al.

(10) Patent No.: US 7,200,077 B2
(45) Date of Patent: Apr. 3, 2007

(54) TILT ANGLE DETECTION DEVICE AND METHOD UTILIZING PATTERN IDENTIFICATION

(75) Inventors: Akinori Ohkubo, Tsurugashima (JP); Takuma Yanagisawa, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 555 days.

(21) Appl. No.: 10/686,780

(22) Filed: Oct. 17, 2003

(65) Prior Publication Data
US 2004/0125712 A1 Jul. 1, 2004

(30) Foreign Application Priority Data
Oct. 21, 2002 (JP) ............................. 2002-305501

(51) Int. Cl.
*G11B 7/18* (2006.01)
(52) U.S. Cl. .................................. 369/44.32; 369/5.19
(58) Field of Classification Search .............. 369/44.32
See application file for complete search history.

(56) References Cited

U.S. PATENT DOCUMENTS 4,589,103 A * 5/1986 Tajima .................... 369/44.32

| 5,130,963 | A | 7/1992 | Kusano et al. |
| 5,886,496 | A | 3/1999 | Furukawa et al. |
| 6,137,754 | A | 10/2000 | Furukawa et al. |
| 6,418,105 | B1 * | 7/2002 | Horino et al. ........... 369/53.37 |
| 6,665,257 | B2 * | 12/2003 | Sano et al. ............ 369/112.01 |
| 6,865,144 | B2 * | 3/2005 | Yanagisawa et al. .... 369/44.32 |
| 6,894,955 | B1 * | 5/2005 | Shimoda et al. ......... 369/44.11 |
| 6,947,360 | B2 * | 9/2005 | Jeong ...................... 369/44.32 |
| 2002/0048243 | A1 | 4/2002 | Yanagisawa et al. |
| 2002/0060965 | A1 | 5/2002 | Tobita et al. |
| 2003/0031112 | A1 | 2/2003 | Horimai |

* cited by examiner

*Primary Examiner*—Gautam R. Patel
(74) *Attorney, Agent, or Firm*—Drinker Biddle & Reath LLP

(57) ABSTRACT

A tilt angle detection device and method which generates, as a first push-pull signal, a difference between light reception signals corresponding to two light receiving surfaces of one side of a photodetector, which are divided along the track tangent direction; generates, as a second push-pull signal, a difference between the light reception signals corresponding to two light receiving surfaces of the other side of the photodetector; and generates a tilt signal that indicates a tilt angle defined by a normal on the recording surface of the optical recording medium at a position of irradiation of the laser beam and the optical axis of the laser beam in accordance to a difference between amplitudes of the first and second push-pull signals.

12 Claims, 18 Drawing Sheets

TILT ANGLE DETECTION DEVICE AND METHOD UTILIZING PATTERN IDENTIFICATION

BACKGROUND OF THE INVENTION

1. Field of the Invention

The present invention relates to a tilt angle detection device and a method for detecting a tilt angle, which is defined as the angle between the normal on a recording surface of an optical recording medium at a position of irradiation of a light beam and the optical axis of the light beam.

2. Description of the Related Art

In order to read recorded data correctly from an optical recording medium such as an optical disk, it is necessary to irradiate a reading beam perpendicularly onto the recording surface of the optical recording medium. However, when warping occurs in the optical recording medium, or when the error in the mechanical system is too great, the reading beam cannot be irradiated perpendicularly onto the recording surface of the optical recording medium, reducing the precision of data reading.

For this reason, a recorded information reproduction device that reproduces recorded information from an optical recording medium detects the inclination (tilt angle) that occurs between a pickup (data reading means) and the optical recording medium with a tilt angle detection device, and restricts reduction in the precision of data reading by carrying out tilt correction processing, in which the entire pickup is inclined in response to the amount of detected tilt.

However, in the conventional tilt angle detection device, there is a problem that a higher equipment cost are involved and equipment becomes more complicated since a tilt detection mechanism such as a tilt sensor is especially required to detect the tilt that occurs between the pickup and the optical recording medium. Furthermore, there is another problem that, at the stage of manufacturing tilt servos, it is necessary to provide an adjustment process in which the tilt detection mechanism is properly adjusted, and that adjustment process is comparatively time-consuming and intricate.

SUMMARY OF THE INVENTION

An object of the present invention is to provide a tilt angle detection device and method that can accurately detect a tilt angle without using a tilt detection mechanism such as a tilt sensor.

According to the present invention, there is provided a tilt angle detection device of an optical recording medium recording/reproducing device provided with an optical system that guides a laser beam irradiated from a light source onto a recording surface of an optical recording medium, and receives at a light receiving portion the laser beam reflected by the recording surface of the optical recording medium, comprising: a photodetector provided at the light receiving portion, which has a light receiving surface divided into at least four segments along a track tangent direction of the optical recording medium and a direction that is perpendicular thereto, and which outputs light reception signals corresponding to an intensity of a laser beam received at the four segments of light receiving surface; a first push-pull signal generator which generates, as a first push-pull signal, a difference between the light reception signals of the photodetector corresponding to two light receiving surfaces of one side of the four light receiving surfaces, which are divided in the track tangent direction; a second push-pull signal generator which generates, as a second push-pull signal, a difference between the light reception signals of the photodetector corresponding to two light receiving surfaces of the other side of the four light receiving surfaces, which are divided in the track tangent direction; and a tilt signal generator which generates a tilt signal that indicates a tilt angle defined by a normal on the recording surface of the optical recording medium at a position of irradiation of the laser beam and the optical axis of the laser beam in accordance to a difference between an amplitude of the first push-pull signal and an amplitude of the second push-pull signal.

According to the present invention, there is provided a tilt angle detection method A tilt angle detection method of an optical recording medium recording/reproducing device provided with an optical system that guides a laser beam irradiated from a light source onto a recording surface of an optical recording medium, and receives at a light receiving portion the laser beam reflected by the recording surface of the optical recording medium, comprising steps of: the light receiving portion having a light receiving surface divided into at least four segments along a track tangent direction of the optical recording medium and a direction that is perpendicular thereto, outputting light reception signals corresponding to an intensity of a laser beam received at each of the four segments of light receiving surface; generating, as a first push-pull signal, a difference between the light reception signals of the photodetector corresponding to two light receiving surfaces of one side of the four light receiving surfaces, which are divided in the track tangent direction; generating, as a second push-pull signal, a difference between the light reception signals of the photodetector corresponding to two light receiving surfaces of the other side of the four light receiving surfaces, which are divided in the track tangent direction; and generating a tilt signal that indicates a tilt angle defined by a normal on the recording surface of the optical recording medium at a position of irradiation of the laser beam and the optical axis of the laser beam in accordance to a difference between an amplitude of the first push-pull signal and an amplitude of the second push-pull signal.

According to the present invention, there is provided an optical recording medium with which a laser beam emitted from a light source in an optical recording medium recording/reproducing device is irradiated on a recording surface, and data is reproduced by receiving the reflected laser beam; wherein a coefficient for each predetermined area of a recording surface is recorded as a data table in order to generate a final tilt signal by individually multiplying the coefficient to a tilt signal that indicates a tilt angle defined by a normal at a position of irradiation of the laser beam and the optical axis of the laser beam, and adding the multiplication results.

DETAILED DESCRIPTION OF THE INVENTION

The following is a detailed description of embodiments of the present invention with reference to the accompanying drawings.

Figure 1:
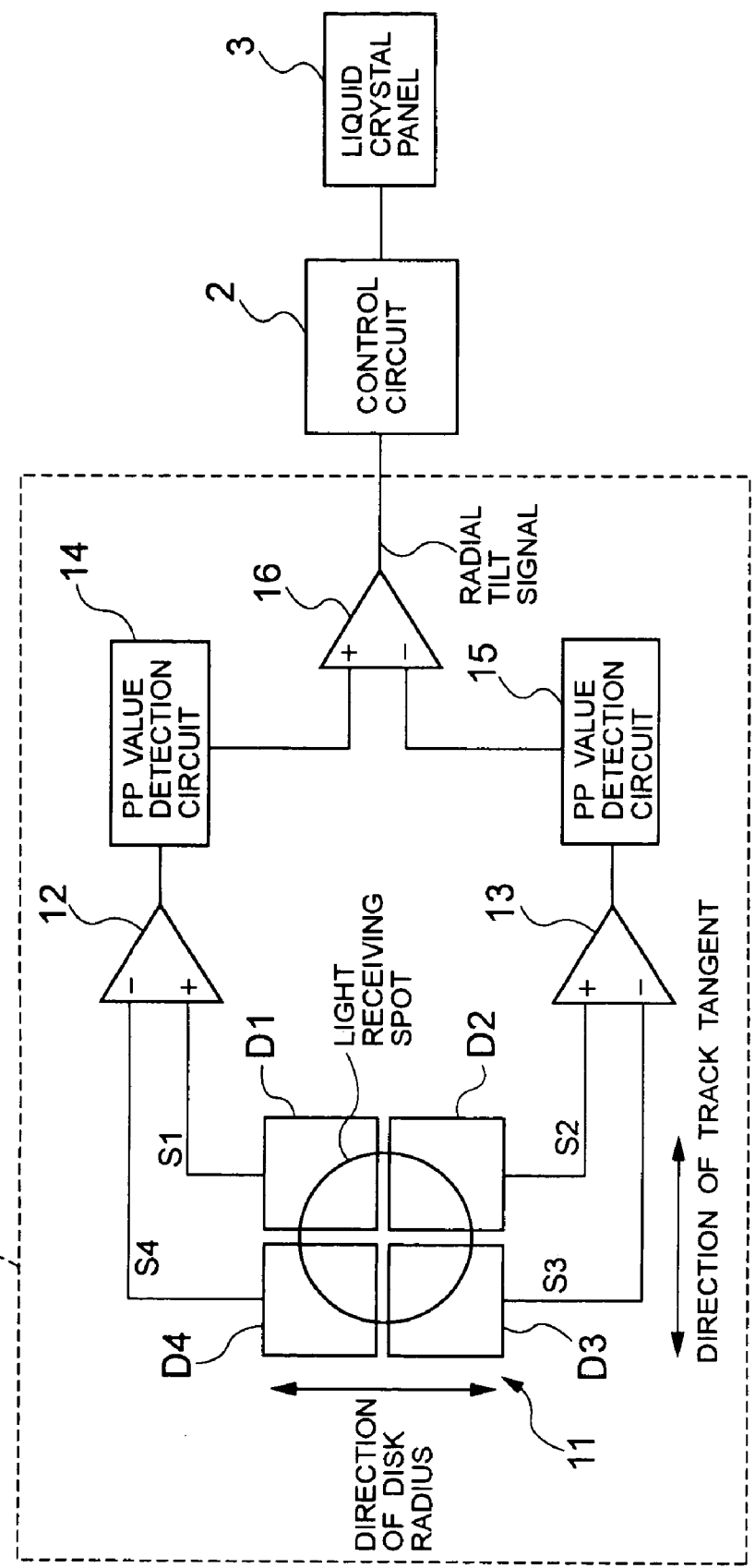
FIG. 1 is a block diagram showing a configuration of a tilt servo control device in which a tilt angle detection device according to the present invention is applied.

FIG. 1 shows a tilt servo control device that includes a tilt angle detection device according to the present invention. The tilt servo control device is applied to an optical disk player, and has a tilt angle detection device 1, a control circuit 2, and a liquid crystal panel 3.

As shown in FIG. 1, the tilt angle detection device 1 includes a four-segment photodetector 11, subtracters 12, 13, and 16, and PP value detection circuits 14 and 15.

The four-segment photodetector 11 is disposed in the pickup, and has photoelectric conversion elements with light receiving surfaces D1 to D4, which are divided into four segments in the direction along the tangent of a data recording track of the optical disk, and the direction of the disk radius, which is at a right angle to the tangent of the recording track. The light receiving surfaces D1 and D4 are positioned on the outer side of the optical disk, and the light receiving surfaces D2 and D3 are positioned on the inner side of the optical disk. The light receiving surfaces D1 and D3 are in a symmetrical relationship in regard to the center of the four segments, and also the light receiving surfaces D2 and D4 are in a symmetrical relationship in regard to the center of the four segments.

The photoelectric conversion elements receive light reflected from the optical disk with the four light receiving surfaces D1 to D4, and output electrical signals corresponding to the intensity of received light as light reception signals S1 to S4. The light reception signals S1 and S4 are supplied to the subtracter 12, and the light reception signals S2 and S3 are supplied to the subtracter 13.

The subtracter 12 subtracts the light reception signal S4 from the light reception signal S1, and supplies a tangential push-pull signal S1–S4, which is a differential signal, to the PP value detection circuit 14. The subtracter 13 subtracts the light reception signal S3 from the light reception signal S2, and supplies a tangential push-pull signal S2–S3 to the PP value detection circuit 15.

The PP value detection circuit 14 detects positive and negative peak values of the tangential push-pull signal S1–S4, and calculates the P—P (peak-to-peak) value from those positive and negative peak values. Likewise, the PP value detection circuit 15 detects the positive and negative peak values of the tangential push-pull signal S2–S3, and calculates the P—P value from those positive and negative peak values.

Figure 2:
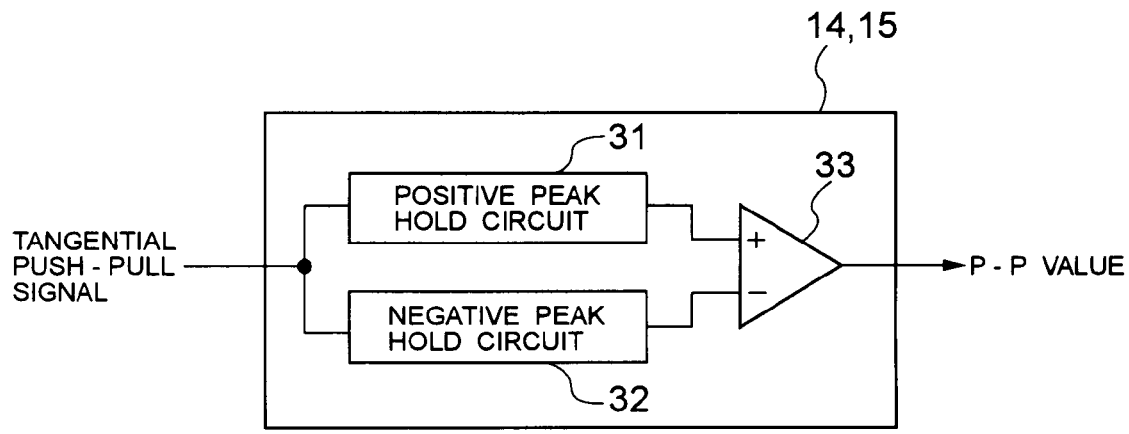
FIG. 2 is a block diagram showing a configuration of a PP value detection circuit in the device of FIG. 1.

Specifically, as shown in FIG. 2, the PP value detection circuits 14 and 15 each include a positive peak hold circuit 31, a negative peak hold circuit 32, and a subtracter 33. The positive peak hold circuit 31 holds the positive peak value of the tangential push-pull signal, and the negative peak hold circuit 32 holds the negative peak value of the tangential push-pull signal. The subtracter 33 subtracts the negative peak value from the positive peak value, and outputs a P—P value as a signal.

The subtracter 16 subtracts the P—P value that is output from the PP value detection circuit 15 from the P—P value that is output from the PP value detection circuit 14, in order to generate a radial tilt signal. The output of the subtracter 16 is the output of the tilt angle detection device 1.

A tilt signal is supplied from the tilt angle detection device 1 to the control circuit 2. The control circuit 2 generates a driving signal to reduce the tilt signal. Specifically, although not shown in the figures, the control circuit 2 is provided with a tilt correction ROM (read only memory) in which a plurality of tilt correction values have been pre-recorded, and reads out three correction values that recorded at the address of the ROM specified by that tilt signal. The read three correction values are output as the driving signal from the control circuit 2. The three correction values correspond to three areas 3a to 3c, which will be discussed later, of the liquid crystal panel 3.

The liquid crystal panel 3 is arranged inside the pickup and is capable of correcting wavefront aberration of the optical system.

Figure 3:
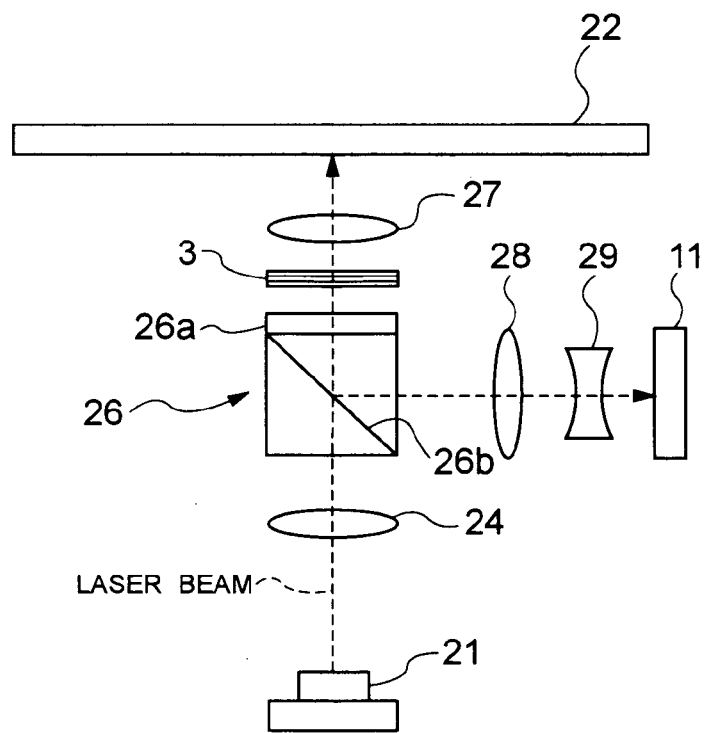
FIG. 3 shows the optical system of a pickup.

As shown in FIG. 3, in addition to the above-mentioned four-segment photodetector 11 and the liquid crystal panel 3, the optical system of the pickup is provided with a semiconductor laser device 21, a collimator lens 24, a polarized beam splitter 26 with an attached polarization plate 26a, an objective lens 27, a focusing lens 28, and a multi-lens 29.

The semiconductor laser device 21 is driven by a driving circuit (not shown in the figures), and emits a laser beam. The outgoing laser beam from the semiconductor laser device 21 is arranged to reach the polarized beam splitter 26 with the attached polarization plate 26a via the collimator lens 24. The polarized beam splitter 26 lets a greater portion (for example, 90%) of the incident laser beam pass through, and the polarization plate 26a converts the linearly-polarized light of the passed through laser beam into circularly-polarized light.

The laser beam that has passed through the polarized beam splitter 26 with the attached polarization plate 26a reaches the optical disk 22 via the liquid crystal panel 3 and the objective lens 27, and is reflected by the recording surface of the optical disk 22. The laser beam reflected by the recording surface of the disk 22 returns to the polarized beam splitter 26 via the objective lens 27, the liquid crystal panel 3, and the polarization plate 26a. The polarization plate 26a converts the returning circularly-polarized light of the laser beam that has been reflected by the disk 22 into linearly-polarized light. The polarized beam splitter 26 reflects the returning laser beam with a polarization splitting surface 26b, and the reflected laser beam arrives at the light receiving surfaces of the four-segment photodetector 11 via the focusing lens 28, and the multi-lens 29.

Figure 4:
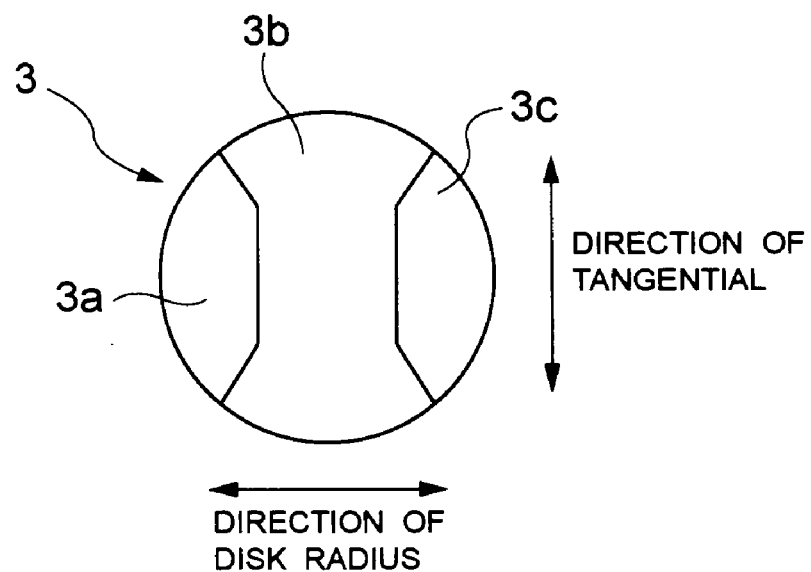
FIG. 4 shows a liquid crystal panel.

The liquid crystal panel 3 is divided along the radius direction into three areas 3a to 3c, for example, as shown in FIG. 4, an inner peripheral area, a middle area, and an outer peripheral area. These three areas 3a to 3c are each variably controlled by individual driving voltages output from the control circuit 2. Therefore, the phase differences of the light that passes through the areas 3a to 3c can be individually altered, thus making it possible to correct wavefront aberration such as coma aberration that occurs due to the tilt caused along the disk radius.

Figure 5:
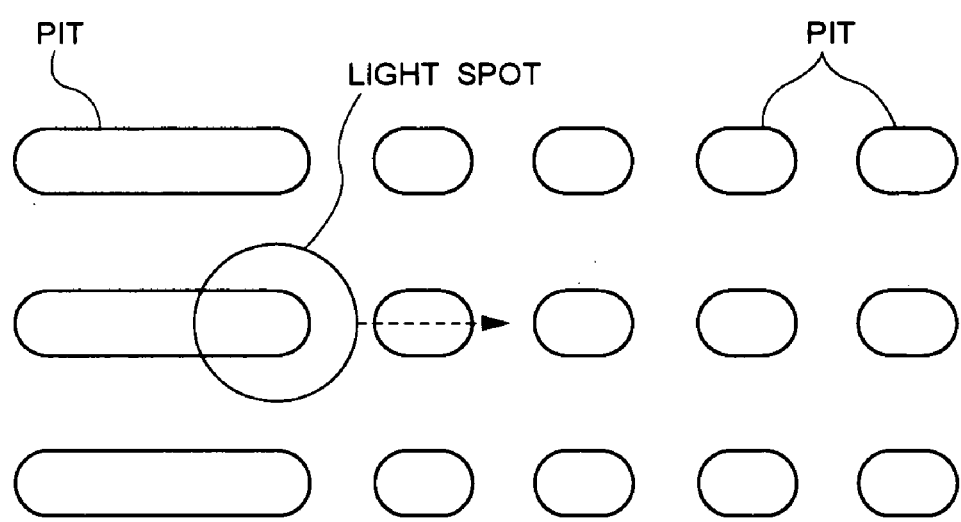
FIG. 5 shows a light spot formed by a laser beam irradiated on a recording surface of an optical disk.

As shown in FIG. 5, when a light spot of a laser beam irradiated on the recording surface of the disk 22, on which pits (including marks) are formed, moves in the direction shown by the arrow, variations in optical characteristics are caused in the direction of that movement (track direction) by the intermittence of the pits. These variations appear as signal level differences between the light reception signals S1 and S4, and also between the light reception signals S2 and S3 in the tilt angle detection device 1. Therefore, the tangential push-pull signal S1–S4 obtained by subtracting the light reception signal S4 from the light reception signal S1, and the tangential push-pull signal S2–S3 obtained by subtracting the light reception signal S3 from the light reception signal S2, can be detected by the subtracters 12 and 13.

Figure 6:
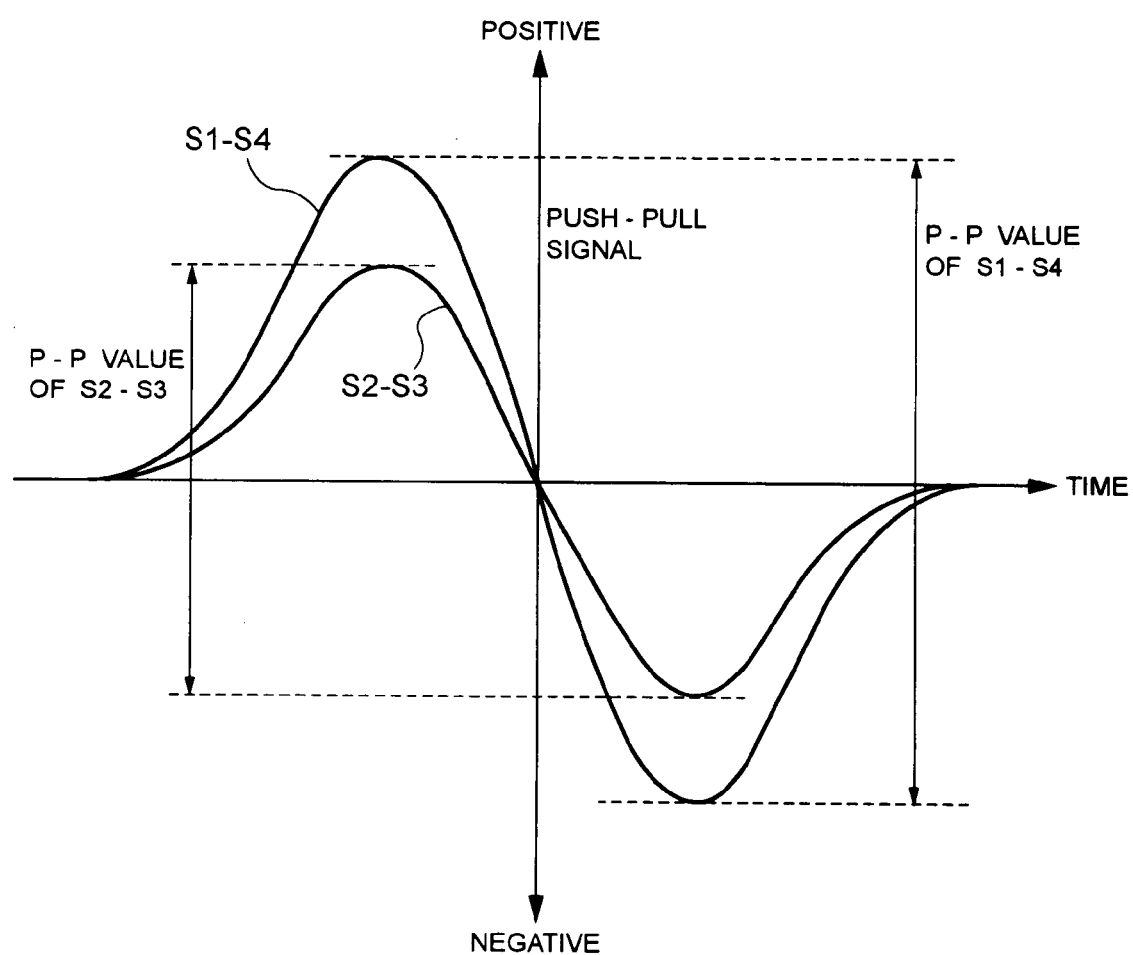
FIG. 6 shows amplitude waveforms of tangential push-pull signals.

As shown in FIG. 6, when there is radial tilt (radius-direction inclination) between the disk 22 and the laser beam irradiated onto the pits of the recording surface of the disk, a level difference is produced between the tangential push-pull signals S1–S4 and S2–S3. FIG. 6 shows the change of the tangential push-pull signals S1–S4 and S2–S3 when the laser beam moves over the pits along the track. The level differences between the signals S1–S4 and S2–S3 become maximal at the peaks and correspond to the size of the radial tilt. Therefore, the difference between the P—P value of the tangential push-pull signal S1–S4 and the P—P value of S2–S3 can be taken by the subtracter 16, and that difference is output as a radial tilt signal that indicates the size of the tilt.

Figure 7:
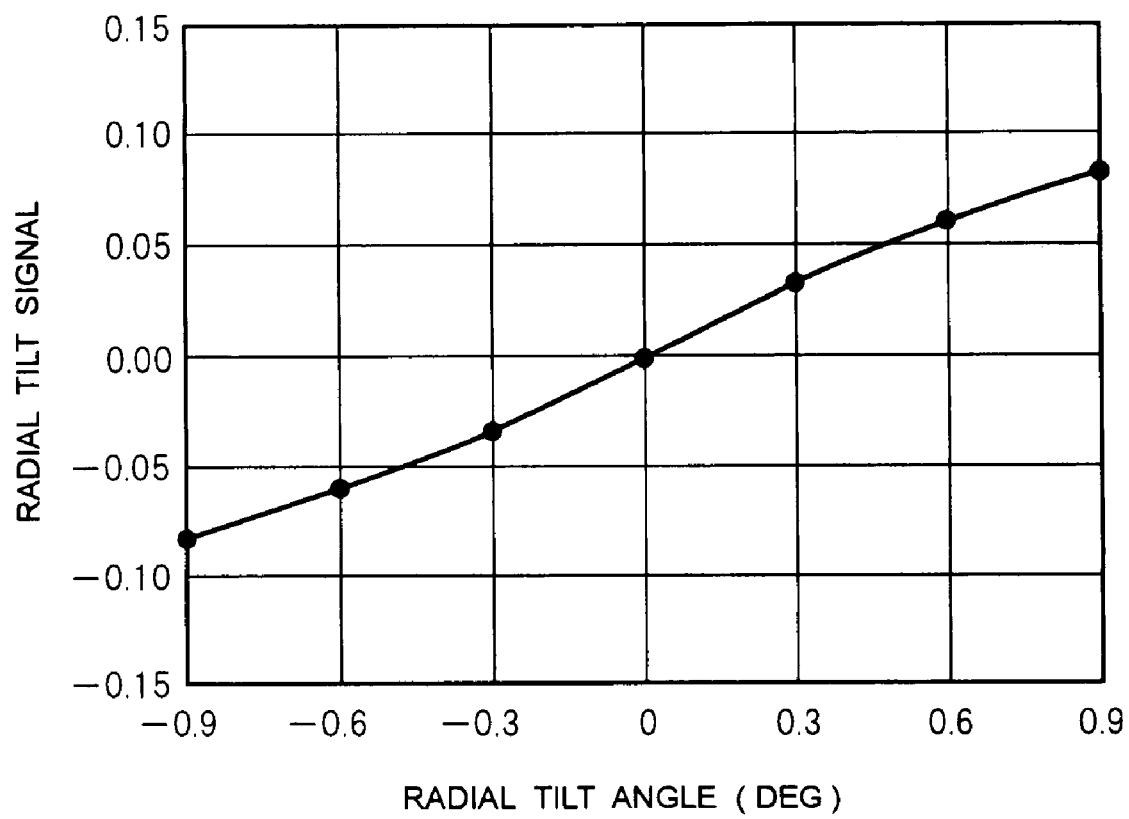
FIG. 7 shows the relationship between a radial tilt angle and a radial tilt signal.

As shown in FIG. 7, the relationship between the radial tilt signal and the actual angle of radial tilt is approximately proportional.

The control circuit 2 produces a driving signal so as to reduce the size of the radial tilt in response to the tilt signals generated by the tilt angle detection device 1, and the areas 3a to 3c of the liquid crystal panel 3 are driven in response to the driving signal.

Figure 8:
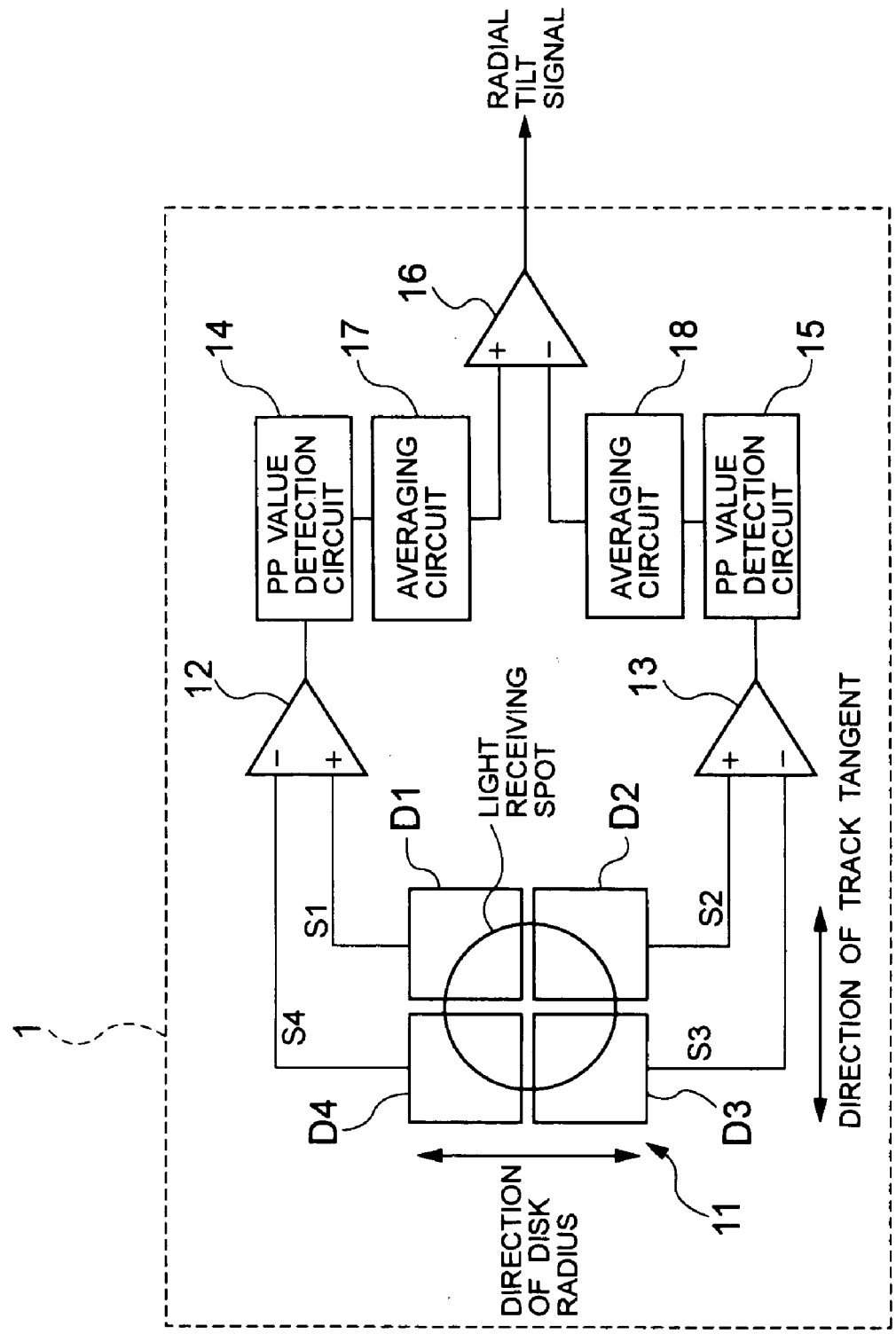
FIG. 8 shows another configuration of the tilt angle detection device.

FIG. 8 shows another configuration of the tilt angle detection device 1. In the tilt angle detection device 1 of FIG. 8, an averaging circuit 17 is inserted between the PP value detection circuit 14 and the subtracter 16, and an averaging circuit 18 is inserted between the PP value detection circuit 15 and the subtracter 16. The averaging circuit 17 calculates and outputs an average value of the P—P values detected by the PP value detection circuit 14. The averaging circuit 18 calculates and outputs an average value of the P—P values detected by the PP value detection circuit 15. The P—P values used in the calculations of the average values are, for example, all the P—P values detected in a period from the present to a predetermined time in the past.

Figure 9:
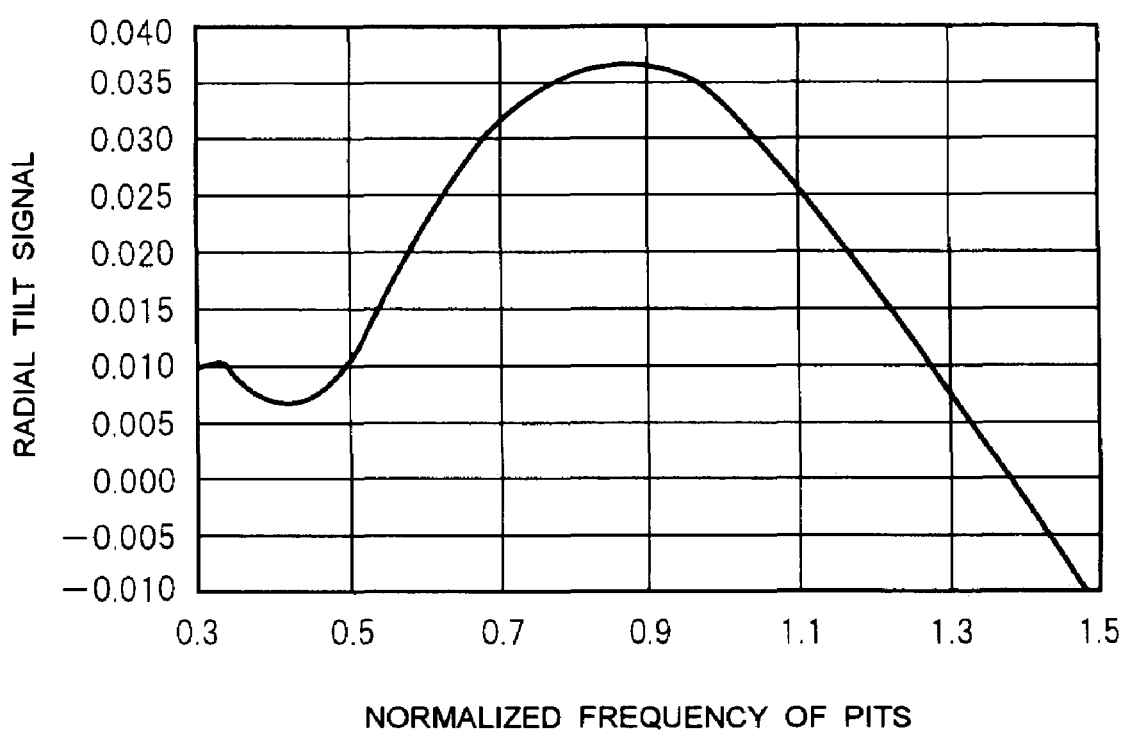
FIG. 9 shows the relationship between a frequency of pit appearance and a radial tilt signal.

When a pit train recorded on the disk 22 consists of pits that appear randomly and not at a predetermined period, there are fluctuations in the levels of the P—P values detected by the P—P value detection circuits 14 and 15. That is, the levels of the P—P values fluctuate in accordance with the period (frequency) with which the pits appear. At these times, as shown in FIG. 9, the levels of the radial tilt signal fluctuate in correspondence to the frequency normalized to NA/λ. It should be noted that NA is the numerical aperture of the objective lens 27, and λ is the wavelength of the laser beam. Normalized frequency refers to the frequency expressed as a ratio taking a frequency corresponding to NA/λ as 1.

In the tilt angle detection device 1 of FIG. 8, after the average values of the P—P values are obtained by the averaging circuits 17 and 18, the difference between the average P—P values is calculated by the subtracter 16, so that a radial tilt signal with reduced level fluctuation can be generated even for a disk 22 that has a pit train formed by pits that appear randomly. This makes stabilized tilt servo control possible. Furthermore, the same effect can be obtained when an averaging circuit is applied to the radial tilt signal in FIG. 1.

Figure 10:
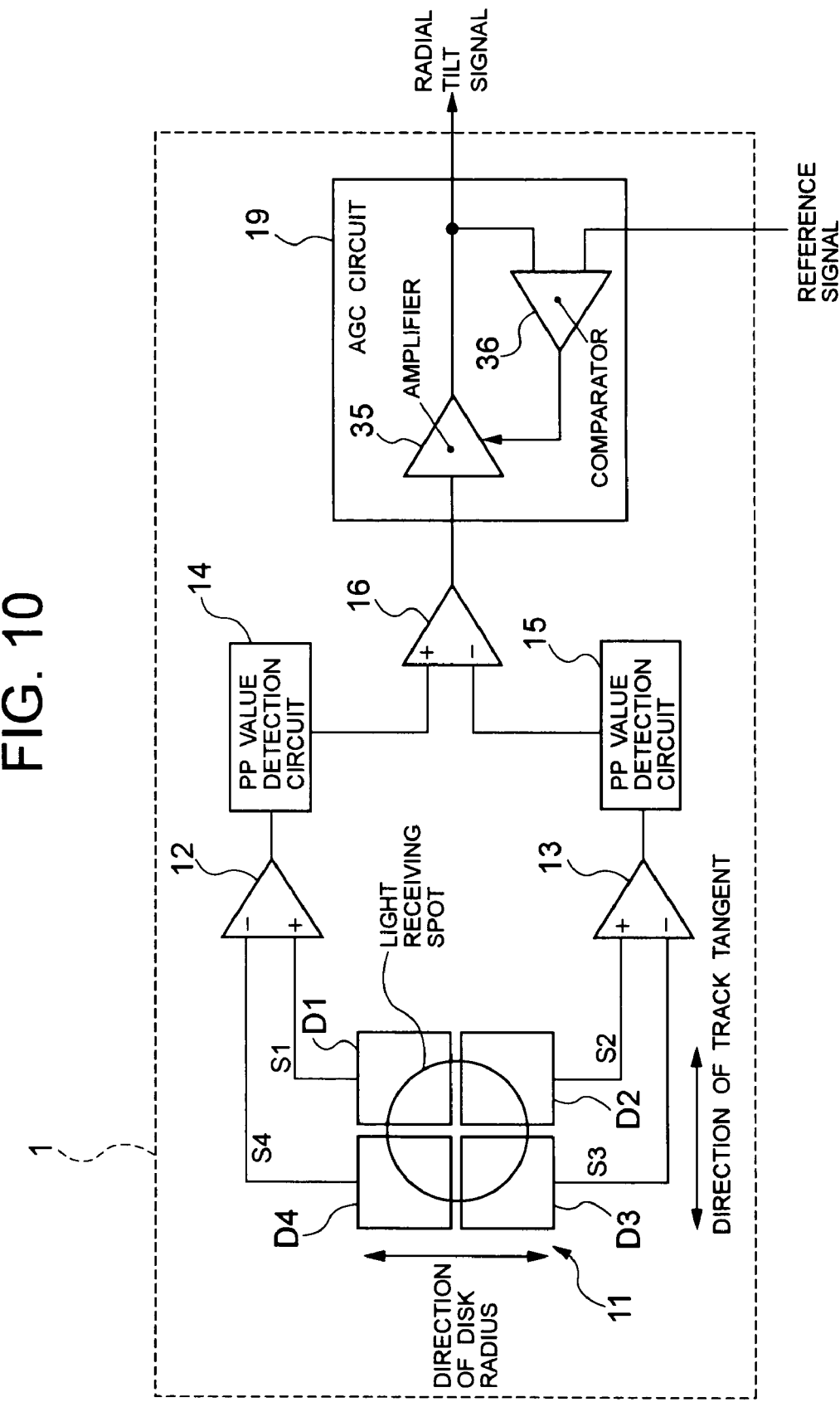
FIG. 10 shows another configuration of the tilt angle detection device.

FIG. 10 shows still another configuration of the tilt angle detection device 1. In the tilt angle detection device 1 of FIG. 10, the output of the subtracter 16 is connected to an AGC (automatic gain control) circuit 19. The AGC circuit 19 includes an amplifier 35 and a comparator 36. The amplifier 35 amplifies the radial tilt signal that is output from the subtracter 16, and outputs it as the output signal of the tilt angle detection device 1. The comparator 36 compares the magnitude of the levels of the radial tilt signal amplified by the amplifier 35 with a reference signal. The reference signal is a signal with a predetermined level, and may be set to an average level of the radial tilt signal. The comparator 36 supplies to the amplifier 35 a signal that expresses the comparison result. The signal that expresses the comparison result may be a level difference, or may be a binary signal in correspondence to the magnitudes. The amplifier 35 adjusts the amplification gain in response to the signal that expresses the comparison result, and amplifies the radial tilt signal by the adjusted gain.

As described above, in the tilt angle detection device 1 of FIG. 10, even if the level of the radial tilt signal that is output from the subtracter 16 fluctuates due to the random period of the pits recorded on the track of disk 22, these level fluctuations can be suppressed by the AGC circuit 19.

It should be noted that, not only can the AGC circuit be arranged at the output stage of the tilt angle detection device 1 as shown in FIG. 10, but AGC circuits may also be arranged between the subtracter 12 and the PP value detection circuit 14, and between the subtracter 13 and the PP value detection circuit 15, and AGC circuits may also be arranged between the PP value detection circuit 14 and the subtracter 16, and between the PP value detection circuit 15 and the subtracter 16.

Figure 11:
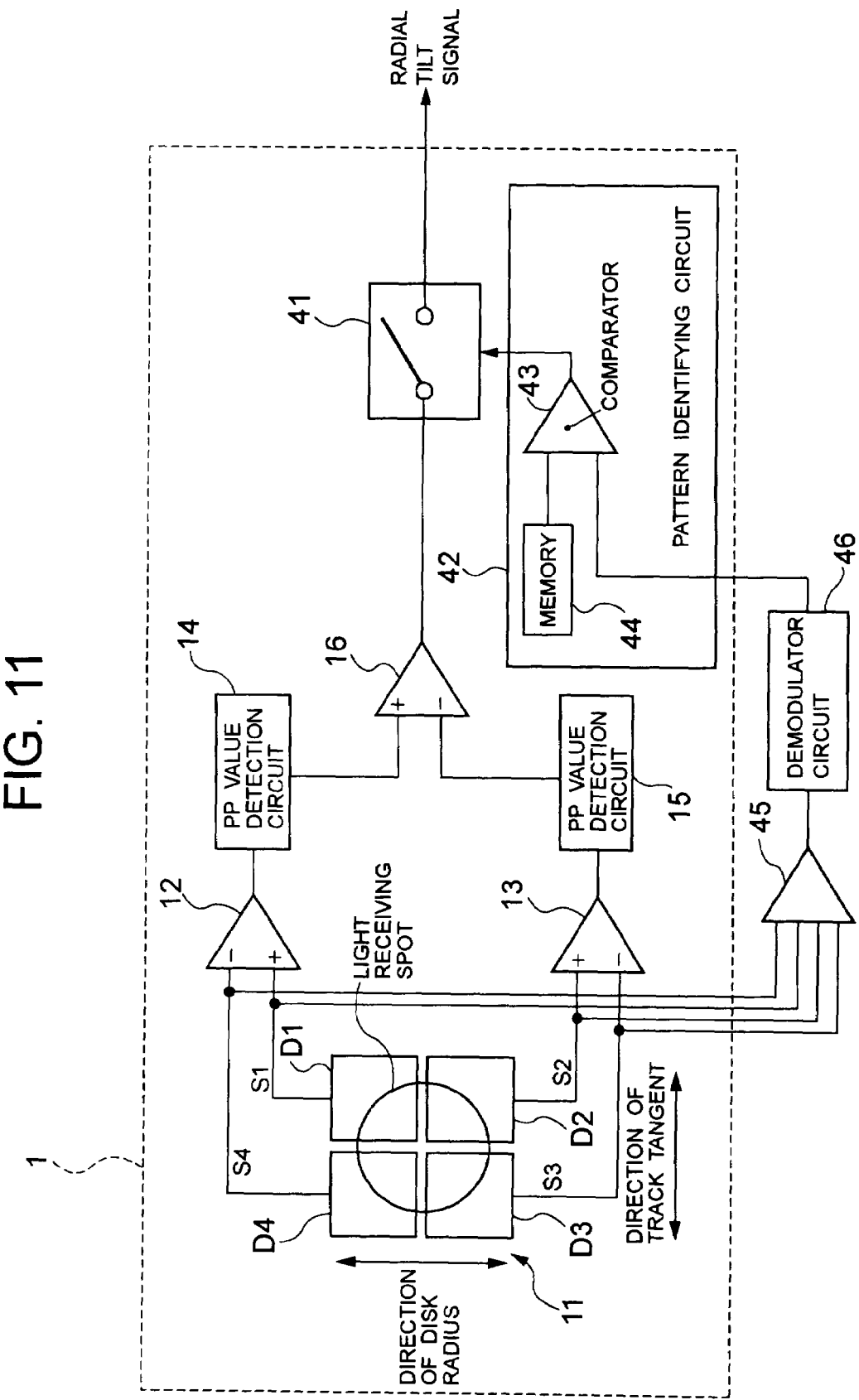
FIG. 11 shows another configuration of the tilt angle detection device.

FIG. 11 shows still another configuration of the tilt angle detection device 1. In the tilt angle detection device 1 of FIG. 11, a switch 41 and a pattern identifying circuit 42 are added to the configuration of FIG. 1. The switch 41 is connected to the output of the subtracter 16. The pattern identifying circuit 42 identifies a pit period as a pattern. The pattern identifying circuit 42 is provided with a comparator 43 and a memory 44. Predetermined reference data is recorded in the memory 44. The comparator 43 is supplied with the reference data recorded in the memory 44 and is also supplied with demodulated data. In order to obtain demodulated data, an adder 45 that adds the output signals S1 to S4 of the four-segment photodetector 11 and outputs an RF signal, and a demodulator circuit 46 that demodulates the RF signal and outputs demodulated data, are provided as shown in FIG. 11. The output signal of the demodulator circuit 46 is supplied to the comparator 43.

In the tilt angle detection device 1 of FIG. 11, the comparator 43 identifies whether or not the demodulated data matches the reference data recorded in the memory 44. When the demodulated data and the reference data match, the comparator 43 produces an ON signal, and when they do not match, it produces an OFF signal. Therefore, when the demodulated data and the reference data match, the switch 41 becomes ON, and the radial tilt signal that is output from the subtracter 16 is then output via the switch 41 and from the tilt angle detection device 1 to the control circuit 2. If demodulated data corresponding to a predetermined portion of the pit train recorded on the track of the disk 22 is stored in the memory 44 as reference data, the output radial tilt signal of the of the tilt angle detection device 1 will not be affected by a random period of the pit train, even if there are level fluctuations in the radial tilt signal that is output from the subtracter 16 due to the random period of the train recorded on the track of the disk 22.

It should be noted that the configuration having the switch 41 and the pattern identifying circuit 42 can be arranged not only at the output stage of the tilt angle detection device 1 as shown in FIG. 11, but a switch and a pattern identifying circuit may also be arranged between the subtracter 12 and the PP value detection circuit 14, and between the subtracter 13 and the PP value detection circuit 15, and a switch and a pattern identifying circuit may also be arranged between the PP value detection circuit 14 and the subtracter 16, and between the PP value detection circuit 15 and the subtracter 16.

Figure 12:
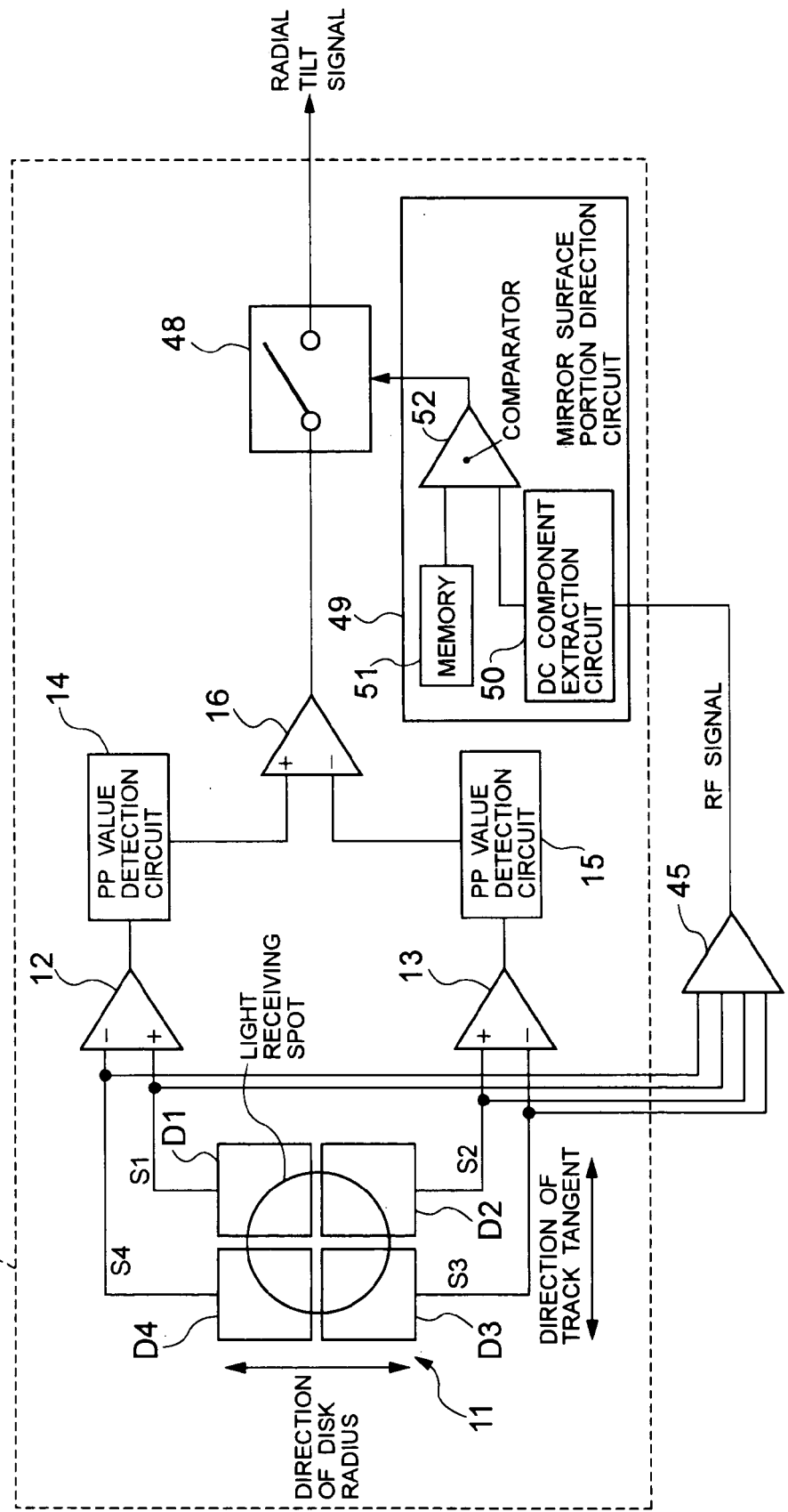
FIG. 12 shows another configuration of the tilt angle detection device.

FIG. 12 shows still another configuration of the tilt angle detection device 1. In the tilt angle detection device 1 of FIG. 12, a switch 48 and a mirror surface portion detection circuit 49 are added to the configuration of FIG. 1. The switch 48 is connected to the output of the subtracter 16. The mirror surface portion detection circuit 49 detects whether or not the position at which the pickup reads from the disk 22 is a mirror surface portion. The mirror surface portion detection circuit 49 includes a DC component extraction circuit 50, a memory 51, and a comparator 52. The RF signal is supplied to the DC component extraction circuit 50. The RF signal is obtained from the above-mentioned adder 45. The DC component extraction circuit 50 extracts the DC component of the RF signal. A level is recorded in the memory 51 for identifying the level of the RF signal at the time of mirror surface portion reading, and this recorded level is output from the memory 51 as a reference level. The comparator 52 compares the DC component extracted by the DC component extraction circuit 50 and the reference level. When the DC component is larger than the reference level, the comparator 52 produces an ON signal, and when the DC component is smaller than the reference level, the comparator 52 produces an OFF signal. The ON signal makes the switch 48 go into an ON state, and the OFF signal makes the switch 48 go into an OFF state. When the switch 48 is in the ON state, the radial tilt signal that is output from the subtracter 16 is output via the switch 48, and from the tilt angle detection device 1 to the control circuit 2.

When the disk 22 is decentered, or when the objective lens 27 of the pickup is shifted in the direction of the disk radius by the tracking servo control, the intensity of the light received at the light receiving surfaces D1 and D4 at the outer perimeter of the four-segment photodetector 11, and the light receiving surfaces D2 and D3 of the inner perimeter becomes asymmetrical. This asymmetry is included in the radial tilt signal as an offset component in accordance with the light receiving signals S1 and S4, and the light receiving signals S2 and S3.

Figure 13:
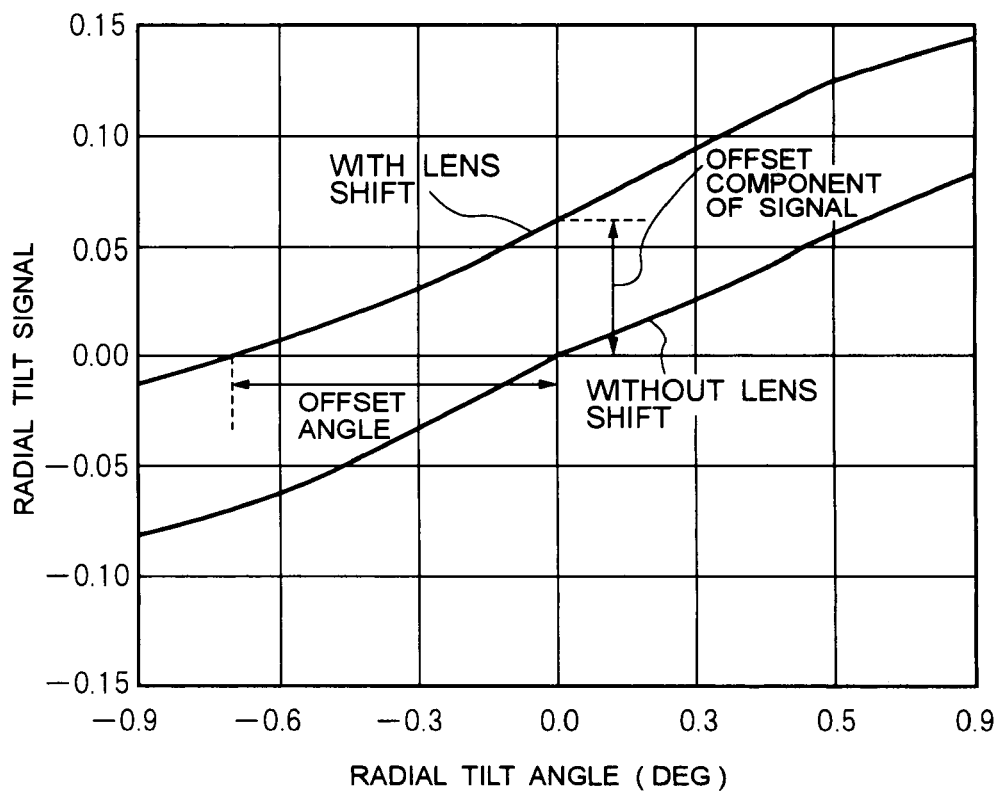
FIG. 13 shows the relationship between a radial tilt angle and a radial tilt signal when there is and is not shift of an objective lens.

FIG. 13 shows the relationship between the radial tilt signal and the radial tilt angle when there is no shift of the objective lens 27 and when there is a shift of the objective lens 27. In FIG. 13, the level difference between the radial tilt signals when the radial tilt angle is 0 degrees is the offset component.

When the radial tilt signal includes an offset component, the liquid crystal panel 3 is driven such that the radial tilt signal can be reduced by the radial tilt servo control. Even when the radial tilt signal is regulated to 0, the tilt angle is in fact regulated to an angle that is offset by the offset component.

Figure 14:
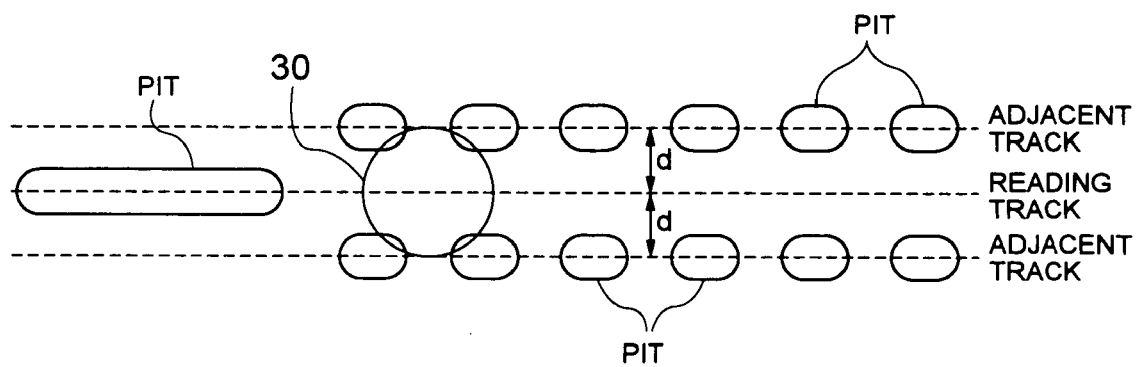
FIG. 14 shows a light spot formed by a laser beam irradiated on a mirror surface portion of a recording surface of an optical disk.
Figure 15:
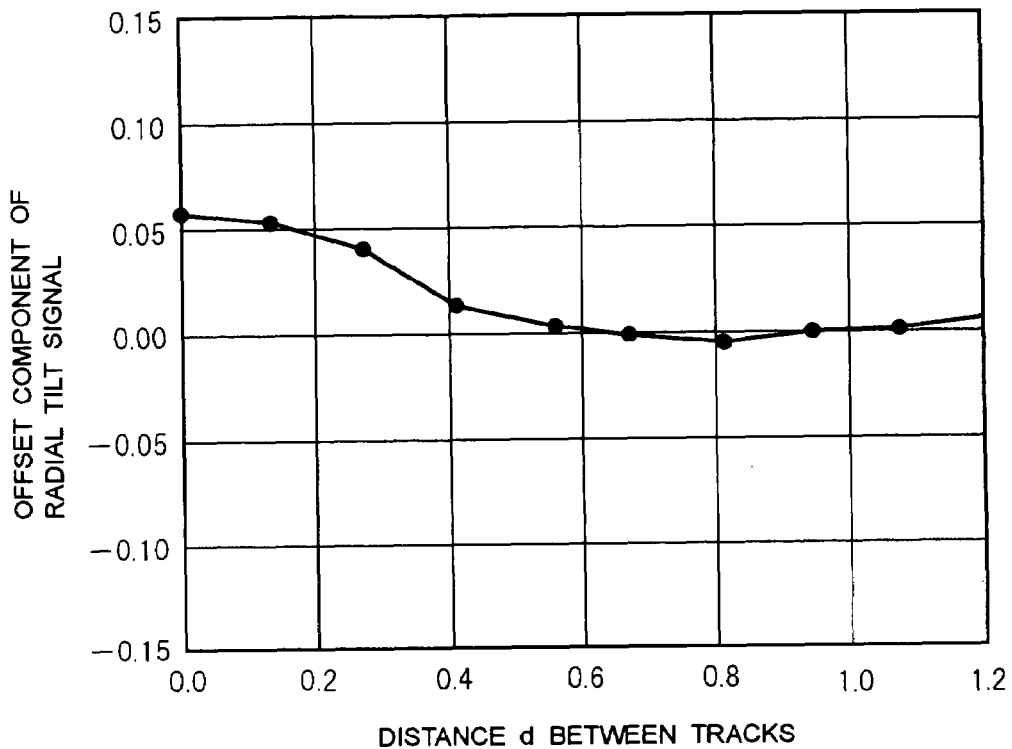
FIG. 15 shows the relationship between a distance between tracks and an offset component of a radial tilt signal.

When the position at which the laser beam irradiates the track of the recording surface of the disk 22 is a mirror surface portion, a light spot 30 is formed, as shown in FIG. 14 for example. Here the distance d between the tracks is a distance that is normalized to $\lambda/NA$ with the numerical aperture NA of the objective lens 27 and the wavelength $\lambda$ of the laser beam. That is, it is a distance expressed as a ratio taking the distance between the tracks corresponding to $\lambda/NA$ as 1. FIG. 15 shows the results of simulating by computer the relationship in the mirror surface portion between the distance d between the tracks and the offset component of the radial tilt signal. As can be seen from the relationship in FIG. 15, if the distance d is larger than approximately 0.6, the offset component can be set to substantially 0.

Therefore, in the tilt angle detection device 1 of FIG. 12, in the period in which the mirror surface portion detection circuit 49 is detecting that a mirror surface portion is being read in response to the RF signal, which is the reading signal from the disk 22, an ON signal is produced from the comparator 52, and the switch 48 is set to ON. When the switch 48 is ON, the radial tilt signal that is output from the subtracter 16 is output via the switch 41, and from tilt angle detection device 1 to the control circuit 2. This radial tilt signal is a signal that occurs during reading of the mirror surface portion of the disk 22, and contains almost no offset component.

The result of this is that, even when the objective lens 27 shifts in the direction of the disk radius, a correct radial tilt signal without offset can be output.

Figure 16:
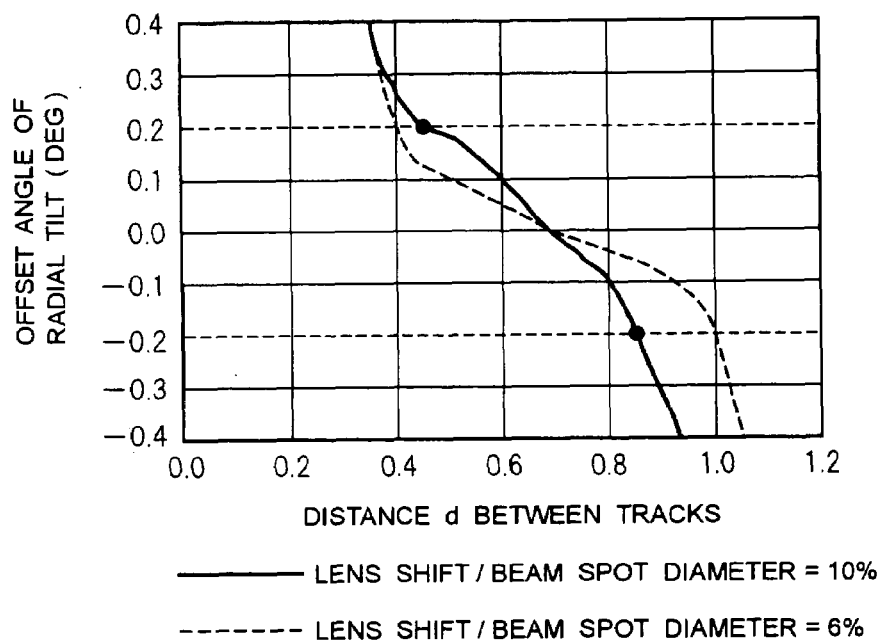
FIG. 16 shows the relationship between a distance between tracks and a radial tilt offset angle.

The result of calculating with computer simulation the fluctuation in the offset angle of the radial tilt in regard to the distance d is shown in FIG. 16. In FIG. 16, the solid line shows the properties of when the shift of the objective lens is 10% of the diameter of the beam spot, and the broken line shows the properties of when the shift of the objective lens is 6% of the diameter of the beam spot.

Normally, if the radial tilt angle is in the range of approximately ±0.2°, there is substantially no adverse effect on the reading signal by the pickup. With this in mind, when the shift of the objective lens is 10% of the diameter of the beam spot, the distance d in FIG. 16 becomes 0.45 to 0.85. Therefore, for a tilt servo control device that uses the tilt angle detection device 1 of FIG. 12, if d is within the range 0.45 to 0.85 in disk 22, the radial tilt signal can be corrected without having an adverse effect on the reading signal when the shift of the objective lens is within 10%.

Figure 17:
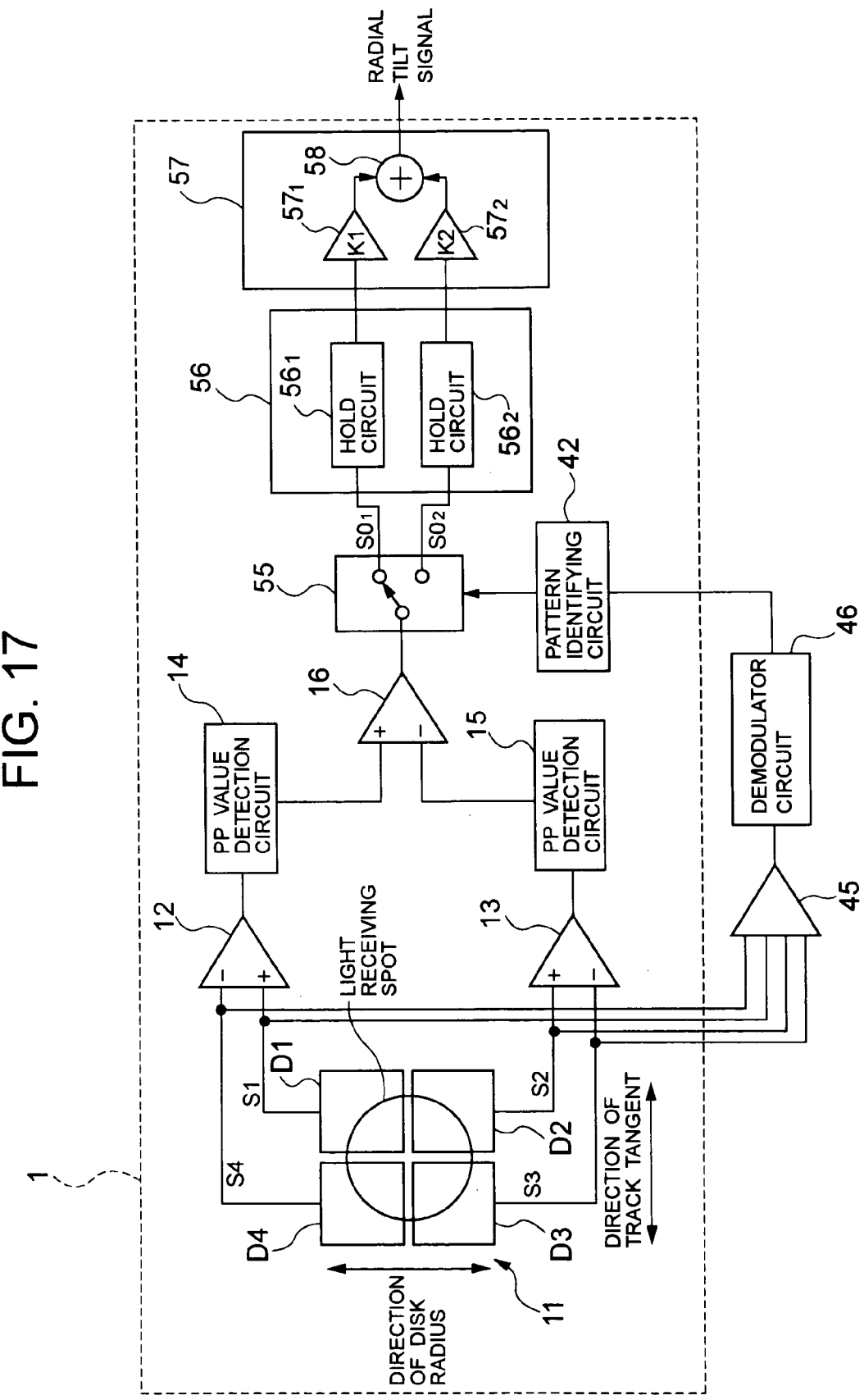
FIG. 17 shows another configuration of the tilt angle detection device.

FIG. 17 shows still another configuration of the tilt angle detection device 1. In the tilt angle detection device 1 of FIG. 17, a selector 55, a time difference correction circuit 56, and an arithmetic circuit 57 are provided instead of the switch 41 in the tilt angle detection device 1 of FIG. 11. The selector 55 is a selector switch, and selectively outputs input signals from either one of the two output terminals $SO_1$ to $SO_2$, depending on the identification result of the pattern identifying circuit 42. The time difference correction circuit 56 subjects the radial tilt signal that is output from the selector 55 to a time correction, and outputs it to the arithmetic circuit 57. In the time difference correction circuit 56, hold circuits $56_1$ and $56_2$ are connected to the output terminals $SO_1$ and $SO_2$. The radial tilt signal held by each of the hold circuits $56_1$ and $56_2$ is output to the arithmetic circuit 57.

The arithmetic circuit 57 includes coefficient multipliers $57_1$ and $57_2$, and an adder 58. The coefficient multipliers $57_1$ and $57_2$ multiply coefficients K1 and K2 with the radial tilt signals output from the time difference correction circuit 56, and supply the multiplication result to the adder 58. The adder 58 adds the radial tilt signals multiplied with coefficients by the coefficient multipliers $57_1$ and $57_2$, to output the added result to the control circuit 2 as the final radial tilt signal.

Figure 18:
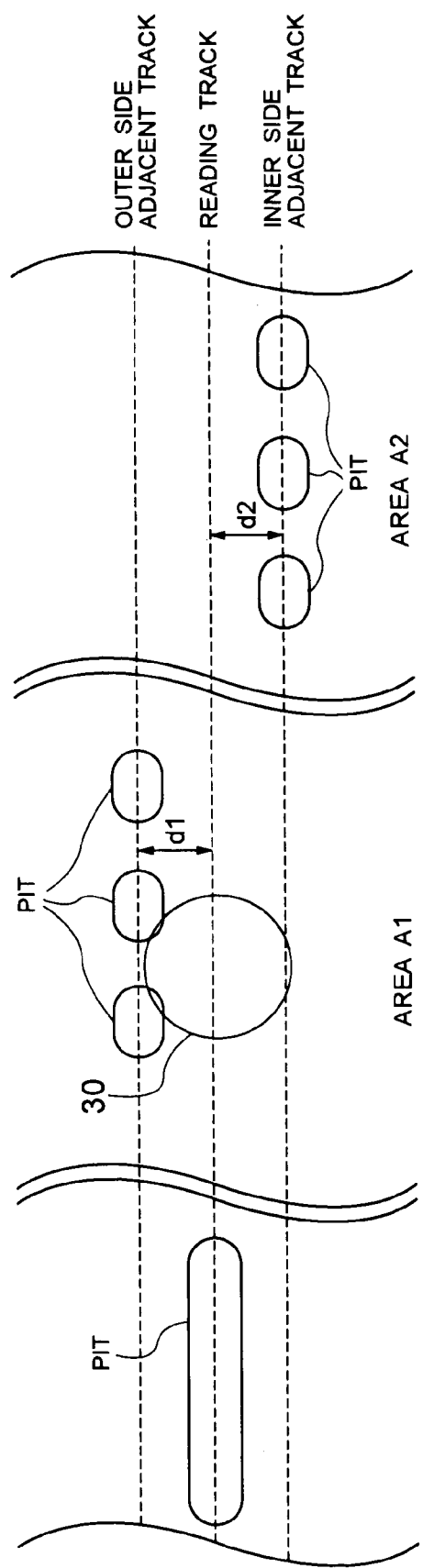
FIG. 18 and FIG. 19 each show that there is a different pattern for each area of a recording surface of an optical disk.
Figure 19:
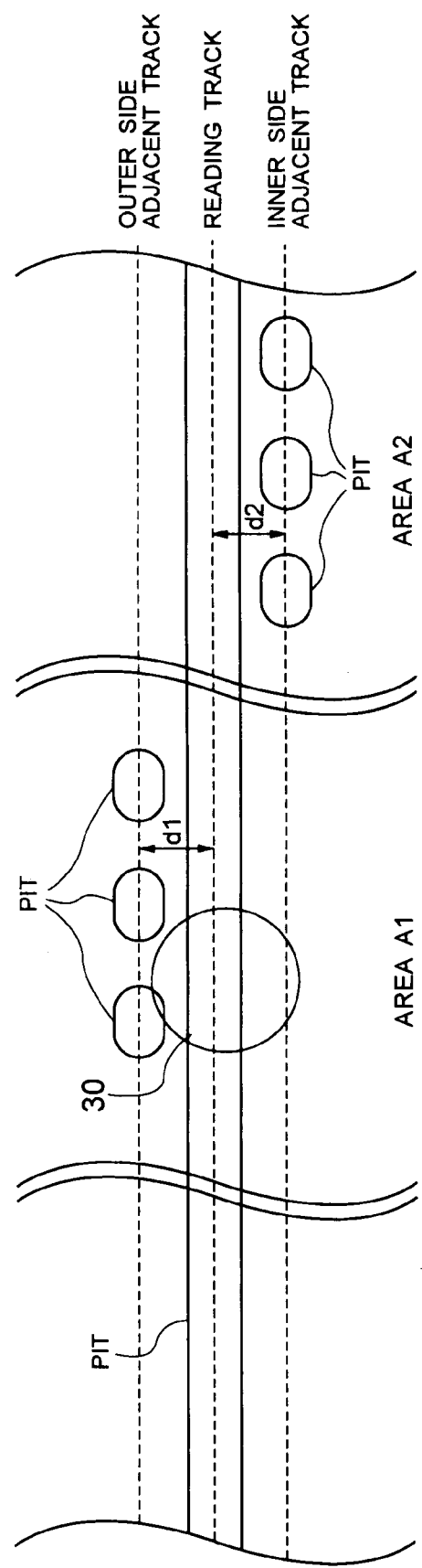

The tilt angle detection device 1 of FIG. 17 is advantageous when the relationship of the arrangement of pit train portions in adjacent tracks to the position of the reading track is asymmetrical. That is, in area A1, as shown in FIGS. 18 and 19, there are pit train portions in the adjacent track to the outer side, and the adjacent track to the inner side is a mirror surface portion, but the opposite situation exists in area A2. When the reading position of the pickup is in area A1 or area A2, an offset component is included in the radial tilt signal that is output from the subtracter 16. The tilt angle detection device 1 of FIG. 17 is configured so as to reduce the effect of this offset component.

In the tilt angle detection device 1 of FIG. 17, when the reading position of the pickup is in the above-described situation of area A1, that fact is identified by the pattern identifying circuit 42. In response to the output signal of the pattern identifying circuit 42, the selector 55 causes the radial tilt signal to be held via the output terminal $SO_1$ as a signal RT1 in the hold circuit $56_1$. The held radial tilt signal RT1 is supplied to the arithmetic circuit 57. After that, when the reading position of the pickup has advanced to the above-described situation of area A2, that fact is identified by the pattern identifying circuit 42. In response to the output signal of the pattern identifying circuit 42, the selector 55 causes the radial tilt signal to be held via the output terminal $SO_2$ as an RT2 in the hold circuit $56_2$. The held radial tilt signal RT2 is supplied to the arithmetic circuit 57. At the arithmetic circuit 57, the coefficient K1 is multiplied with the held radial tilt signal RT1 by the coefficient multiplier $57_1$, and the coefficient K2 is multiplied with the held radial tilt signal RT2 by the coefficient multiplier $57_2$. As shown below, the adder 58 adds the radial tilt signals multiplied by coefficients by the coefficient multipliers $57_1$ and $57_2$, generating the final radial tilt signal RT.

$$RT = K1 \cdot RT1 + K2 \cdot RT2$$

When the coefficients K1 and K2 are approximately equal to the adjacent distances d1 and d2, and the pit train portion in the adjacent track on the outer side in area A1 and the pit train portion in the adjacent track on the inner side in area A2 are approximately equal, then $K1=K2=\frac{1}{2}$ for example.

Figure 20:
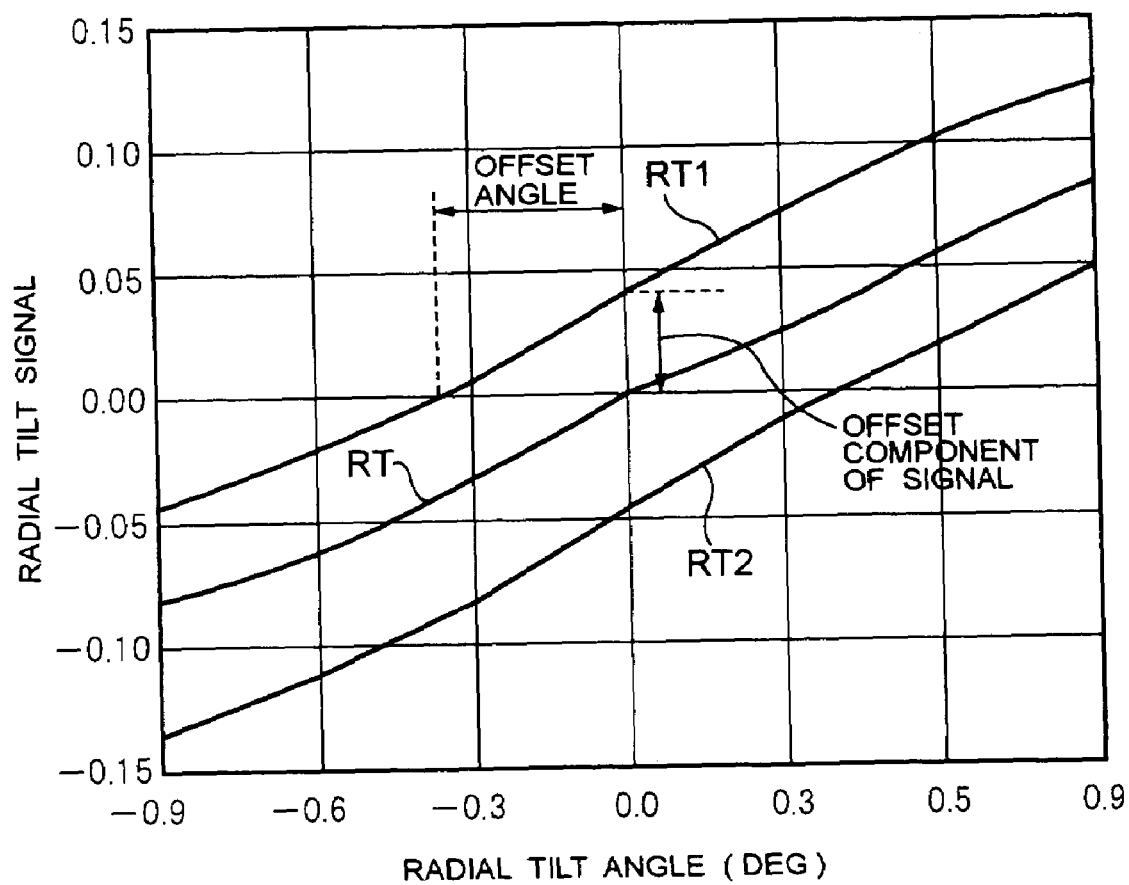
FIG. 20 shows the relationship between a radial tilt angle and a radial tilt signal.

FIG. 20 shows the relationship between the radial tilt signals RT1 and RT2, and the radial tilt angle of each RT. The radial tilt signal RT is a signal in which the offset components included in the radial tilt signals RT1 and RT2 have been removed.

In this way, when using the tilt angle detection device 1 of FIG. 17, a final radial tilt signal is calculated using the radial tilt signals for areas in which the timing of reading is different, so the offset components included in radial tilt signals can be reduced when the relationship of the arrangement of pit train portions in adjacent tracks to the position of the reading track is asymmetrical.

Furthermore, the coefficients K1 and K2 are not limited to ½, and may be a value other than that. Further still, when the distances d1 and d2 are not approximately equal, or when the pit train portion in the adjacent track on the outer side in area A1 and the pit train portion in the adjacent track on the inner side in area A2 are not approximately equal, then the offset components included in the radial tilt signals RT1 and RT2 are different, and therefore the coefficients K1 and K2 are accordingly set to different values.

Furthermore, both the radial tilt signals RT1 and RT2 are held in the time difference correction circuit 56 in the above embodiment, but it is also possible to hold only the radial tilt signal RT1, and for the radial tilt signal RT2 to not be held but supplied as it is to the arithmetic circuit 57.

Figure 21:
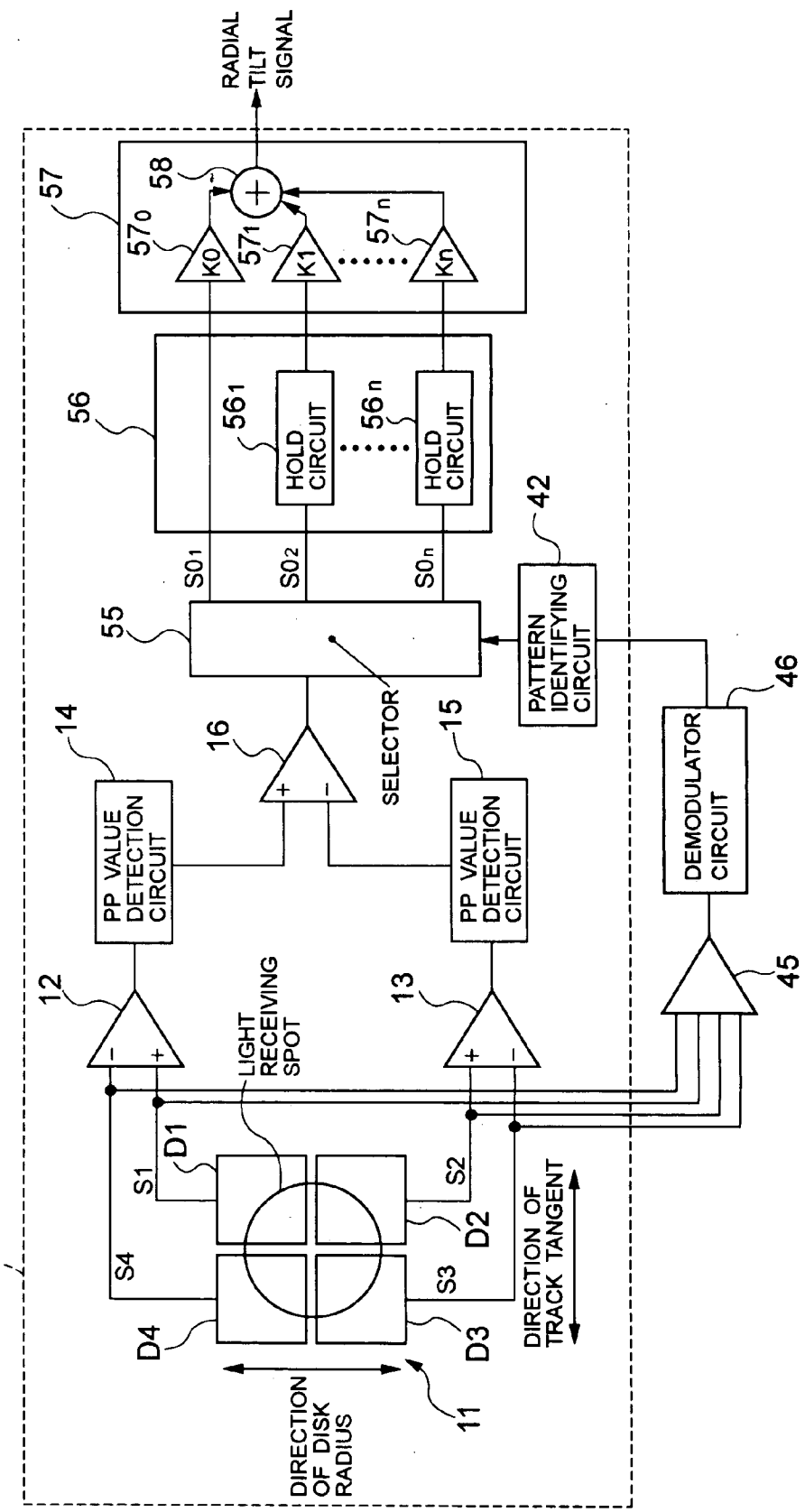
FIG. 21 shows another configuration of the tilt angle detection device.

Furthermore, as shown in FIG. 21, addition may also be carried out after multiplying the coefficients for radial tilt signals of a plurality of areas. In the tilt angle detection device 1 of FIG. 21, the selector 55 selectively outputs input signals from any one of the n+1 output terminals $SO_0$ to $SO_n$, depending on the identification result of the pattern identifying circuit 42. The time difference correction circuit 56 outputs the radial tilt signal that is supplied from the output terminal $SO_0$ as it is to the arithmetic circuit 57. The hold circuits $56_1$ to $56_n$ are connected to the output terminals $SO_1$ to $SO_n$. The radial tilt signal held by each of the hold circuits $56_1$ and $56_n$ is output to the arithmetic circuit 57. The coefficient multipliers $57_0$ to $57_n$ of the arithmetic circuit 57 multiply the coefficients K0 to Kn with the radial tilt signals RT0 to RTn that are output from the time difference correction circuit 56, and supply the multiplication result to the adder 58. The adder 58 adds the radial tilt signals multiplied by coefficients by the coefficient multipliers $57_0$ to $57_n$, to output the added result to the control circuit 2 as the final radial tilt signal. The radial tilt signal RT may be expressed as:

$$RT = K0 \cdot RT0 + K1 \cdot RT1 + \ldots + Kn \cdot RTn$$

Figure 22:
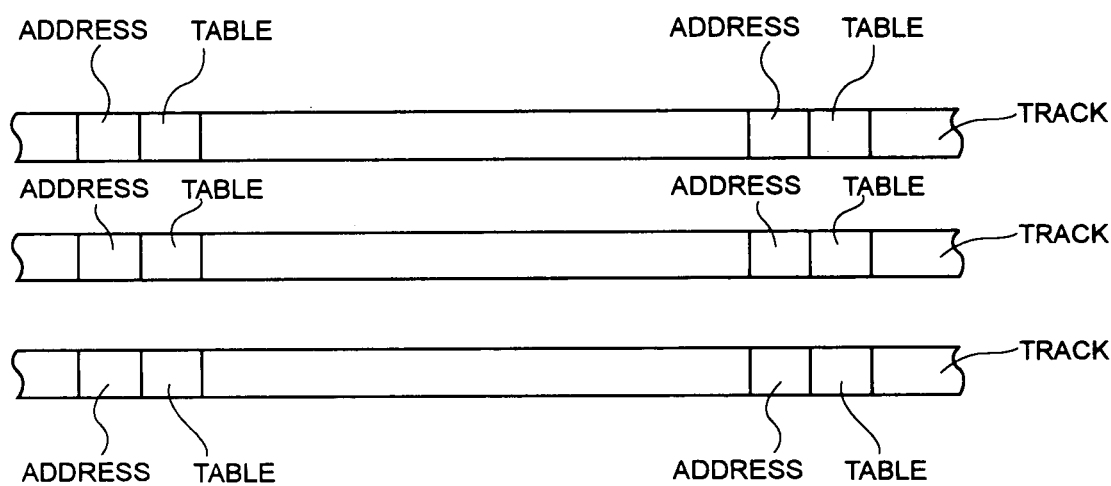
FIG. 22 shows a disk on which tables are recorded.

The coefficients K0 to Kn are preset as tables in correspondence to each of the areas of the disk 22. The tables of set coefficients K0 to Kn can be recorded on the disk 22, and can be read out when reproducing the data of the disk. For example, as shown in FIG. 22, a table can be recorded on the track of the disk 22 for each area of address recording. Furthermore, the recording of the tables can be at regular intervals or at random intervals.

It should be noted that the configuration having the selector 55, the time difference correction circuit 56, and the arithmetic circuit 57 can be arranged not only at the output stage of the tilt angle detection device 1 as shown in FIGS. 17 and 21, but may also be arranged between the PP value detection circuit 14 and the subtracter 16, and between the PP value detection circuit 15 and the subtracter 16.

In the above embodiments, a tilt servo control device is shown that uses a liquid crystal panel 3 as a tilt angle adjusting means in order to compensate the radial tilt signal, but a configuration in which an actuator is provided that mechanically adjusts the tilt of the pickup or the objective lens with respect to the optical disk, and in which the actuator is driven in response to the tilt error signal, may also be used.

Furthermore, the above embodiments are described for the case of an optical disk, but the present invention can also be applied to other optical recording media such as an optical card. Furthermore, the above embodiments are described for the case of using a tilt servo control device that generates a radial tilt signal, but in regard to the cancellation of the offset component of the radial tilt signal, it is also possible to similarly use cancellation of the offset component of a push-pull signal that is brought about by the radial tilt angle.

As described above, the tilt angle can be accurately detected without using any tilt detection mechanism in particular such as a tilt sensor, as the present invention is provided with a first push-pull signal producing means for producing a first push-pull signal of the difference between the light reception signals corresponding to two of the light receiving surfaces of one side of the four light receiving areas that are divided along the track tangent of the light receiving device, a second push-pull signal producing means for producing a second push-pull signal of the difference between the light reception signals corresponding to two of the light receiving surfaces of the other side of the four light receiving areas that are divided along the track tangent, and a tilt signal generating means for generating a tilt signal that expresses the tilt angle in response to the difference between the amplitude of the first push-pull signal and the amplitude of the second push-pull signal. As a result, a compact pickup can be achieved, tilt servo control device adjustments become simple, and moreover, the cost of tilt servo control devices can be reduced.

This application is based on a Japanese Patent Application No. 2002-305501 which is hereby incorporated by reference.

What is claimed is:

1. A device for detecting a tilt angle of an optical recording medium recording/reproducing device provided with an optical system that guides a laser beam irradiated from a light source onto a recording surface of an optical recording medium, and receives at a light receiving portion the laser beam reflected by the recording surface of the optical recording medium, comprising:
  a photodetector provided at the light receiving portion, which has a light receiving surface divided into at least four segments along a track tangent direction of the optical recording medium and a direction that is perpendicular thereto, and which outputs light reception signals corresponding to an intensity of a laser beam received at the four segments of light receiving surface;
  a first push-pull signal generator which generates, as a first push-pull signal, a difference between the light reception signals of said photodetector corresponding to two light receiving surfaces of one side of the four light receiving surfaces, which are divided in the track tangent direction;
  a second push-pull signal generator which generates, as a second push-pull signal, a difference between the light reception signals of said photodetector corresponding to two light receiving surfaces of the other side of the four light receiving surfaces, which are divided in the track tangent direction; and
  a tilt signal generator which generates a tilt signal that indicates a tilt angle defined by a normal on the recording surface of said optical recording medium at a position of irradiation of the laser beam and the optical axis of the laser beam in accordance to a difference between an amplitude of the first push-pull signal and an amplitude of the second push-pull signal,
  wherein said tilt signal generator includes:
    a pattern identifying device which identifies whether or not a track pattern at a center position in which the laser beam is irradiated on the recording surface of said optical recording medium is a predetermined pattern; and
    a switching element which turns on to relay the tilt signal when the predetermined pattern is identified by said pattern identifying device.

2. The tilt angle detection device according to claim 1, wherein said tilt signal generator includes:
  a first PP value detection circuit for detecting a P—P (peak-to-peak) value of the first push-pull signal;
  a second PP value detection circuit for detecting a P—P value of the second push-pull signal; and
  a subtracter for subtracting the PP value detected by the second PP value detection circuit from the PP value detected by said first PP value detection circuit to generate the tilt signal.

3. The tilt angle detection device according to claim 2, wherein said tilt signal generator has an automatic gain control circuit; and
  wherein said automatic gain control circuit is arranged at one of an input line of each of said first PP value detection circuit and said second PP value detection circuit, each connection line between said first PP value detection circuit and said subtracter and between said second PP value detection circuit and said subtracter, and an output line of said subtracter.

4. The tilt angle detection device according to claim 1, wherein said tilt signal generator has an averaging circuit for averaging a level of at least one of the push-pull signal and the tilt signal.

5. The tilt angle detection device according to claim 1, wherein the predetermined pattern is a mirror surface portion.

6. A device for detecting a tilt angle of an optical recording medium recording/reproducing device provided with an optical system that guides a laser beam irradiated from a light source onto a recording surface of an optical recording medium, and receives at a light receiving portion the laser beam reflected by the recording surface of the optical recording medium, comprising:
  a photodetector provided at the light receiving portion, which has a light receiving surface divided into at least four segments along a track tangent direction of the optical recording medium and a direction that is perpendicular thereto, and which outputs light reception signals corresponding to an intensity of a laser beam received at the four segments of light receiving surface;
  a first push-pull signal generator which generates, as a first push-pull signal, a difference between the light reception signals of said photodetector corresponding to two light receiving surfaces of one side of the four light receiving surfaces, which are divided in the track tangent direction;
  a second push-pull signal generator which generates, as a second push-pull signal, a difference between the light reception signals of said photodetector corresponding to two light receiving surfaces of the other side of the four light receiving surfaces, which are divided in the track tangent direction; and a tilt signal generator which generates a tilt signal that indicates a tilt angle defined by a normal on the recording surface of said optical recording medium at a position of irradiation of the laser beam and the optical axis of the laser beam in accordance to a difference between an amplitude of the first push-pull signal and an amplitude of the second push-pull signal, wherein said tilt signal generator includes:

a pattern identifying device which identifies a track pattern at a center position in which the laser beam is irradiated on the recording surface of said optical recording medium; and an arithmetic device which calculates a final tilt signal in response to a plurality of tilt signals when patterns of a plurality of predetermined areas are individually identified by said pattern identifying device.

7. The tilt angle detection device according to claim 6, comprising:

a holding device which holds the tilt signals when a pattern that indicates the predetermined area is identified by said pattern identifying device.

8. The tilt angle detection device according to claim 6, wherein said arithmetic device includes:

a multiplication device which multiplies a coefficient to the tilt signal for each tilt signal when a pattern of each of the plurality of predetermined areas is identified by said pattern identifying device; and an adder which adds the multiplication results of said multiplication device to calculate the final tilt signal.

9. The tilt angle detection device according to claim 8, wherein said arithmetic device has a storage element in which the coefficient is stored for each of the plurality of predetermined areas.

10. The tilt angle detection device according to claim 9, wherein said storage element has an optical recording medium on which the coefficient for each of the plurality of predetermined areas is recorded as a data table.

11. A tilt angle detection method of an optical recording medium recording/reproducing device provided with an optical system that guides a laser beam irradiated from a light source onto a recording surface of an optical recording medium, and receives at a light receiving portion the laser beam reflected by the recording surface of said optical recording medium, comprising steps of:

the light receiving portion having a light receiving surface divided into at least four segments along a track tangent direction of the optical recording medium and a direction that is perpendicular thereto, outputting light reception signals corresponding to an intensity of a laser beam received at each of the four segments of light receiving surface;

generating, as a first push-pull signal, a difference between the light reception signals of said photodetector corresponding to two light receiving surfaces of one side of the four light receiving surfaces, which are divided in the track tangent direction;

generating, as a second push-pull signal, a difference between the light reception signals of said photodetector corresponding to two light receiving surfaces of the other side of the four light receiving surfaces, which are divided in the track tangent direction; and generating a tilt signal that indicates a tilt angle defined by a normal on the recording surface of said optical recording medium at a position of irradiation of the laser beam and the optical axis of the laser beam in accordance to a difference between an amplitude of the first push-pull signal and an amplitude of the second push-pull signal;

identifying whether or not a track pattern at a center position in which the laser beam is irradiated on the recording surface of said optical recording medium is a predetermined pattern and relaying the tilt signal by turning on a switching element when the predetermined pattern is identified in the pattern identifying step.

12. A tilt angle detection method of an optical recording medium recording/reproducing device provided with an optical system that guides a laser beam irradiated from a light source onto a recording surface of an optical recording medium, and receives at a light receiving portion the laser beam reflected by the recording surface of said optical recording medium, comprising steps of:

the light receiving portion having a light receiving surface divided into at least four segments along a track tangent direction of the optical recording medium and a direction that is perpendicular thereto, outputting light reception signals corresponding to an intensity of a laser beam received at each of the four segments of light receiving surface;

generating, as a first push-pull signal, a difference between the light reception signals of said photodetector corresponding to two light receiving surfaces of one side of the four light receiving surfaces, which are divided in the track tangent direction;

generating, as a second push pull signal, a difference between the light reception signals of said photodetector corresponding to two light receiving surfaces of the other side of the four light receiving surfaces, which are divided in the track tangent direction;

generating a tilt signal that indicates a tilt angle defined by a normal on the recording surface of said optical recording medium at a position of irradiation of the laser beam and the optical axis of the laser beam in accordance to a difference between an amplitude of the first push-pull signal and an amplitude of the second push-pull signal;

identifying a track pattern at a center position in which the laser beam is irradiated on the recording surface of said optical recording medium; and calculating a final tilt signal in response to a plurality of tilt signals when patterns of a plurality of predetermined areas are individually identified in the pattern identifying step.

* * * * *